(12) United States Patent
Chen et al.

(10) Patent No.: US 10,552,486 B2
(45) Date of Patent: Feb. 4, 2020

(54) GRAPH METHOD FOR SYSTEM SENSITIVITY ANALYSES

(71) Applicant: INTERNATIONAL BUSINESS MACHINES CORPORATION, Armonk, NY (US)

(72) Inventors: Chia-Yu Chen, White Plains, NY (US); Pei-Yun Hsueh, New York, NY (US); Jui-Hsin Lai, White Plains, NY (US); Yinglong Xia, Rye Brook, NY (US)

(73) Assignee: International Business Machines Corporation, Armonk, NY (US)

( * ) Notice: Subject to any disclaimer, the term of this patent is extended or adjusted under 35 U.S.C. 154(b) by 724 days.

(21) Appl. No.: 15/165,144

(22) Filed: May 26, 2016

(65) Prior Publication Data
US 2017/0344558 A1  Nov. 30, 2017

(51) Int. Cl.
*G06F 16/901* (2019.01)
(52) U.S. Cl.
CPC ................ *G06F 16/9024* (2019.01)
(58) Field of Classification Search
USPC ........................................................ 716/139
See application file for complete search history.

(56) References Cited

U.S. PATENT DOCUMENTS

| | | | |
|---|---|---|---|
| 6,099,582 A | 8/2000 | Haruki | |
| 7,096,443 B2 | 8/2006 | Berthold et al. | |
| 7,421,671 B2 | 9/2008 | Korobkov | |
| 7,694,244 B2 | 4/2010 | Chan et al. | |
| 7,823,106 B2 | 10/2010 | Baker et al. | |
| 8,527,936 B2 | 9/2013 | Jain et al. | |
| 8,640,079 B2 | 1/2014 | Majumder et al. | |
| 2015/0055821 A1* | 2/2015 | Fotland | G06K 9/3241 382/103 |
| 2015/0077323 A1* | 3/2015 | Ramaswamy | G06F 3/012 345/156 |
| 2015/0269298 A1 | 9/2015 | Dai et al. | |
| 2016/0335603 A1* | 11/2016 | Davar | G06Q 10/1053 |

(Continued)

FOREIGN PATENT DOCUMENTS

GB    2391088 A    1/2004

OTHER PUBLICATIONS

Zhang et al., "Speeding up VLSI Layout Verification Using Fuzzy Attributed Graphs Approach," IEEE Transactions on Fuzzy Systems, vol. 14, No. 6, Dec. 2006, pp. 728-737.

(Continued)

*Primary Examiner* — Mohammed Alam
(74) *Attorney, Agent, or Firm* — L. Jeffrey Kelly

(57) ABSTRACT

A computer-implemented method, computer program product, and system for determination of critical parts and component correlations in a circuit using a correlation graph and centrality analysis including; receiving a circuit layout portion of a larger circuit layout, converting the circuit layout portion into a correlation graph representing components as nodes and connecting wires as edges, determining, using ground truth and Naïve Bayes to determine correlation weighting, scaling the correlation graph to represent the larger circuit, and presenting the larger correlation graph on a graphical user interface (GUI).

20 Claims, 9 Drawing Sheets

(56) References Cited

U.S. PATENT DOCUMENTS

2017/0344558 A1* 11/2017 Chen .................. G06F 16/9024

OTHER PUBLICATIONS

Gupta et al., "Low-Power Digital Signal Processing Using Approximate Adders," IEEE Transactions on Computer-Aided Design of Integrated Circuits and Systems, vol. 32, No. 1, Jan. 2013, pp. 124-137.
Mell et al., "The NIST Definition of Cloud Computing", National Institute of Standards and Technology, Special Publication 800-145, Sep. 2011, pp. 1-7.
Bonacich, "Power and Centrality: A Family of Measures", American Journal of Sociology, The University of Chicago Press, vol. 92, No. 5 (Mar. 1987), accessed: Feb. 19, 2012 20:22, pp. 1170-1182.
Borgatti, "Centrality and Network Flow", (Elsevier) Social Networks 27, (2005) pp. 55-71.

* cited by examiner

GRAPH METHOD FOR SYSTEM SENSITIVITY ANALYSES

BACKGROUND

The present invention relates generally to the field of circuit analysis, and more particularly to the determination of critical parts and component correlations in a circuit.

With growing system complexities and circuit scaling, circuit sensitivity checks are becoming more challenging and more important when analyzing issues such as, for example, device variation, yield, and reliability. Typically, system sensitivity checks are performed by testing circuit components one-by-one in simulators, which can cause problems when considering technology scaling.

System checks may be performed to find critical parts (e.g., components or grouping of components within a circuit) to better understand how components work together when different workloads are applied to the circuit. Process variation and yield become challenging in Scaled CMOS technology (less than 14 nm technology nodes). New transistor technology (e.g., CNT, III-V, PCM) tends to be more sensitive to process and result in larger variations.

Centrality is a known theory discussed in a number of scholarly articles including: Borgatti, Stephen P. (2005). "Centrality and Network Flow" and Bonacich, Phillip (1987). "Power and Centrality: A Family of Measures". Centrality is used in graph theory and network analysis using indicators of centrality to identify the most important vertices within a graph. Applications include identifying the most influential person(s) in a social network, key infrastructure nodes in the Internet or urban networks, and super-spreaders of disease. Centrality concepts were first developed in social network analysis, and many of the terms used to measure centrality reflect their sociological origin. Centrality indices indicate what characterizes an important vertex and is given in terms of a real-valued function on the vertices of the graph. Each vertex can be given a rank which identifies the most important nodes in the graph.

Centrality characterization by network flows, a network can be considered a description of the paths along which something flows. The path of flow allows a characterization based on the type of flow and the type of path encoded by the centrality. A flow can be based on transfers, where each indivisible item goes from one node to another, like a package delivery which goes from the delivery site to a client's house. A second case is the serial duplication, where this is a replication of the item which goes to the next node. The last case is the parallel duplication, with the item being duplicated to several links at the same time, like a radio broadcast which provides the same information to many listeners at once, (or as applicable to an embodiment in the present invention, signals that are sent to multiple nodes such as multiple components in a circuit).

With regards to centrality characterization by walk structure, an alternative classification can be derived from how the centrality is constructed. This can be split into two classes. Centralities are either Radial or Medial. Radial centralities count walks which start/end from the given vertex. When centralities are categorized by their approach to cohesiveness, it becomes apparent that the majority of centralities inhabit one category. The count of the number of walks starting from a given vertex differs only in how walks are defined and counted. Restricting consideration to this group allows for a soft characterization which places centralities on a spectrum from walks of length one (degree centrality) to infinite walks (eigenvalue centrality). The degree and eigenvalue centralities are examples of radial centralities, counting the number of walks of length one or length infinity. Medial centralities count walks which pass through the given vertex. The canonical example is Freeman's betweenness centrality, the number of shortest paths which pass through the given vertex.

Centrality indices have two important limitations, one obvious and the other subtle. The obvious limitation is that a centrality which is optimal for one application is often sub-optimal for a different application. Indeed, if this were not so, we would not need so many different centralities. The more subtle limitation is the commonly held fallacy that vertex centrality indicates the relative importance of vertices. Centrality indices are explicitly designed to produce a ranking which allows indication of the most important vertices. The error is two-fold. Firstly, a ranking only orders vertices by importance; it does not quantify the difference in importance between different levels of the ranking. This may be mitigated by applying Freeman centralization to the centrality measure in question, which provide some insight to the importance of nodes depending on the differences of their centralization scores. Furthermore, Freeman centralization enables one to compare several networks by comparing their highest centralization scores.

SUMMARY

Embodiments of the present invention disclose a method, computer program product, and system for determination of critical parts and component correlations in a circuit using a correlation graph and centrality analysis including; receiving, by one or more computer processors, one or more circuit layout portion of an entire circuit layout, where each circuit layout portion includes components and component connections; converting, by one or more computer processors, the received circuit layout portions into a correlation graph, where the components are represented as nodes and the component connections are represented by edges; determine, by one or more computer processors, ground truth for the received circuit layout portions; applying, by one or more computer processors, one or more workloads to the correlation graphs; and determining, by one or more computer processors, a component correlation and component weighting for the correlation graphs by applying a centrality analysis and using the ground truth and Naïve Bayes.

BRIEF DESCRIPTION OF THE DRAWINGS

The following detailed description, given by way of example and not intended to limit the invention solely thereto, will best be appreciated in conjunction with the accompanying drawings, in which.

The drawings are not necessarily to scale. The drawings are merely schematic representations, not intended to portray specific parameters of the invention. The drawings are intended to depict only typical embodiments of the invention. In the drawings, like numbering represents like elements.

DETAILED DESCRIPTION

Figure 1:
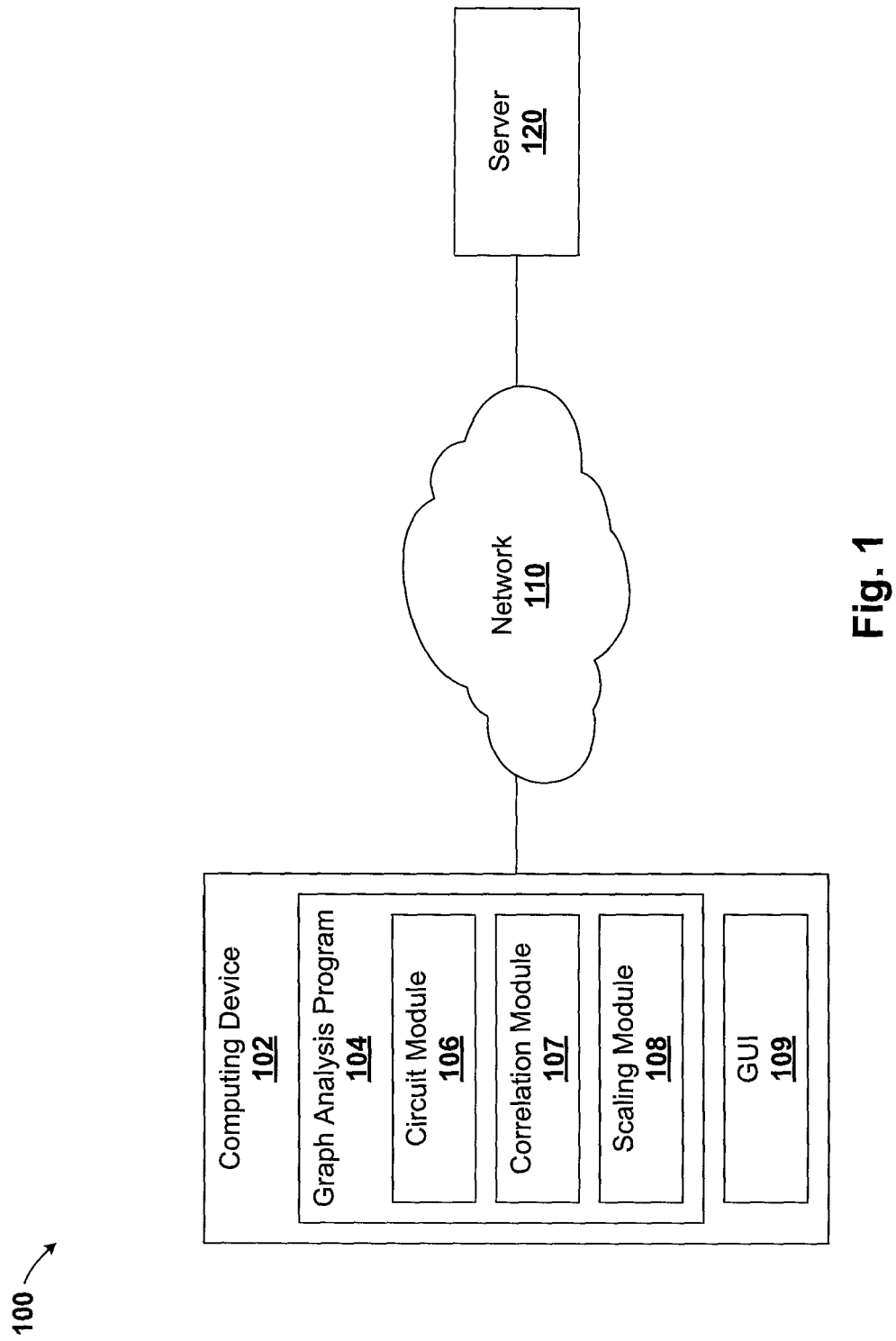
FIG. 1 is a functional block diagram illustrating a graph analysis environment, according to an exemplary embodiment.

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. Rather, these exemplary embodiments are provided so that this disclosure will be thorough and complete and will fully convey the scope of this invention to those skilled in the art. In the description, details of well-known features and techniques may be omitted to avoid unnecessarily obscuring the presented embodiments.

References in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The present invention relates generally to the field of circuit analysis, and more particularly to the determination of critical parts and component correlations in a circuit. Typically, system sensitivity checks are performed by testing circuit components one-by-one in simulators, which can cause problems when considering technology scaling. According to one embodiment of the present invention, a circuit can be analyzed by converting a portion of the circuit into a graphical correlation graph having components and data flow by, for example, representing components (e.g., transistors) as nodes and data flow as edges. The correlation graph can be scaled up to cover the entire circuit by, for example, connecting overlapping small correlation graphs and extrapolating remaining portions of the circuit or, alternatively, interpolating circuit portions between non-overlapping correlation graphs. Furthermore, multiple workloads can be performed on the correlation graphs, either by converted portions, or by scaled models of the entire circuit, to identify critical parts and/or component correlations in a circuit.

According to an embodiment of the present invention, for one or more workload applied to the received circuit layout, centrality (discussed in the background) may be used identify critical parts and component correlations for one or more centrality analysis, such as, for example, betweenness centrality, closeness centrality, eigenvector centrality, degree centrality, harmonic centrality, and katz centrality. Due to the limitations of centrality discussed in the background, a ground truth in a small system and naïve BN may be used to determine the best weights to apply to the centrality analysis for more accurate weights to be applied to all graph metrics. One embodiment by which to generate a circuit correlation graph to identify the critical parts and component correlation is described in detail below referring to the accompanying drawings FIGS. 1-10.

FIG. 1 is a functional block diagram of graphical analysis computer network environment 100, according to an embodiment. More specifically, the computer network environment 100 includes computing device 102 and server 120 connected through network 110. It should be appreciated that illustrated figures provide only an illustration of one implementation and does not imply any limitations with regard to the environments in which different embodiments may be implemented (e.g., one or more computing devices 102 and/or servers 120, or alternatively, a stand-alone computing device). Many modifications to the depicted environments may be made based on design and implementation requirements.

Network 110 can be, for example, a local area network (LAN), a wide area network (WAN) such as the Internet, or a combination of the two, and can include wired, wireless, or fiber optic connections. In general, network 110 can be any combination of connections and protocols that will support communications between server computer 102 and computing device 104.

Server computer 120 may be a laptop computer, tablet computer, netbook computer, personal computer (PC), a desktop computer, a personal digital assistant (PDA), a smart phone, a SMS capable phone, or any programmable electronic device capable of communicating with computing device 102 via network 110. Server computer 102 may include internal and external hardware components, as depicted and described in further detail with respect to FIG. 8.

Computing device 104 may be a laptop computer, tablet computer, netbook computer, personal computer (PC), a desktop computer, a personal digital assistant (PDA), a smart phone, a SMS capable phone, or any programmable electronic device capable of communicating with server 120 via network 110. Computing device 104 may also include internal and external hardware components similar to server 102, as depicted and described in further detail with respect to FIG. 8. Computing device 104 may also include graph analysis program 104, which is a collection of machine readable instructions and data used to receive, correlate, scale, and analyze a portion of a circuit design and scaled circuit designs, according to one or more embodiments of the present invention. Graph analysis program 104 can perform the aforementioned instructional tasks using a plurality of modules including, for example, circuit module 106, correlation module 107, and scaling module 108. Graphical analysis program 104 can also represent the circuit layout during any instructional step to a user via graphical user interface (GUI) 109 on computing device 102.

Circuit module 106 is a collection of machine readable instructions and data used to receive circuit layouts (either in their entirety or in portions), according to one or more embodiments of the present invention. The received circuit layout may be, for example, known to a user (e.g., provided by the circuit designer) or may be reverse engineered using any method known in the art. The circuit design can include any number of components such as, for example, transistors and connecting wires. The circuit layout can be in any format known in the art, and may be represented on computing device 102 using a computer aided drafting (CAD) program and GUI 109.

Correlation module 107 is a collection of machine readable instructions and data used to generate (convert) a correlation graph for received circuit layouts (received by circuit module 106), according to one or more embodiments of the present invention. The correlation graph can be generated by representing the received circuit layouts as nodes (e.g., components such as transistors) and edges (e.g., data flow). Once the correlation graph is generated, one or more workloads may be applied to the correlation graph to identify critical parts and component correlations. The workloads may be applied by sampling component signals over long periods of time to observe correlations using, for example, centrality (discussed in the background). For example, the workloads may be applied to each correlation graph for specific centrality determinations (e.g., betweenness centrality, closeness centrality, eigenvector centrality, degree centrality, harmonic centrality, and katz centrality). Correlation module 107 also builds a ground truth in a small system to identify weighting values to apply to each node to determine the importance or correlation of the nodes for each correlation graph. Furthermore, correlation module 107 uses the ground truth in addition to Naïve Bayes to determine the best weights for all graph metrics.

Centrality can be used when applying the one or more workloads to generate importance factors and correlations between circuit nodes in the correlation graph. The term "importance" as used herein refers to, for example, the amount of usage of a component during specific workloads. The term "correlation" as used herein refers to, for example, the relationship between components during the one or more workloads. When the correlation graph is constructed, degree of centrality and correlations can be estimated through some graph metrics such as page rank, betweenness centrality, and closeness centrality. The importance and correlation of components is further discussed in reference to FIGS. 4-7. Once the correlation graph is generated, scaling module 108 can reproduce the correlation graph, which may be a small portion of the entire circuit layout, as a scaled correlation graph to identify critical parts and correlations between components across the entire circuit layout. Alternatively, the correlation graphs may be scaled and then analyzed for critical parts and component correlation.

Scaling module 108 is a collection of machine readable instructions and data used to scale the portions of the circuit layout to incorporate the remaining, unidentified, or uncorrelated portions of the entire circuit layout, according to one or more embodiments of the present invention. As discussed above, the correlation graphs can be scaled up to cover the entire circuit by, for example, connecting overlapping small correlation graphs and extrapolating remaining portions of the circuit or, alternatively, interpolating circuit portions between non-overlapping correlation graphs.

Figure 2:
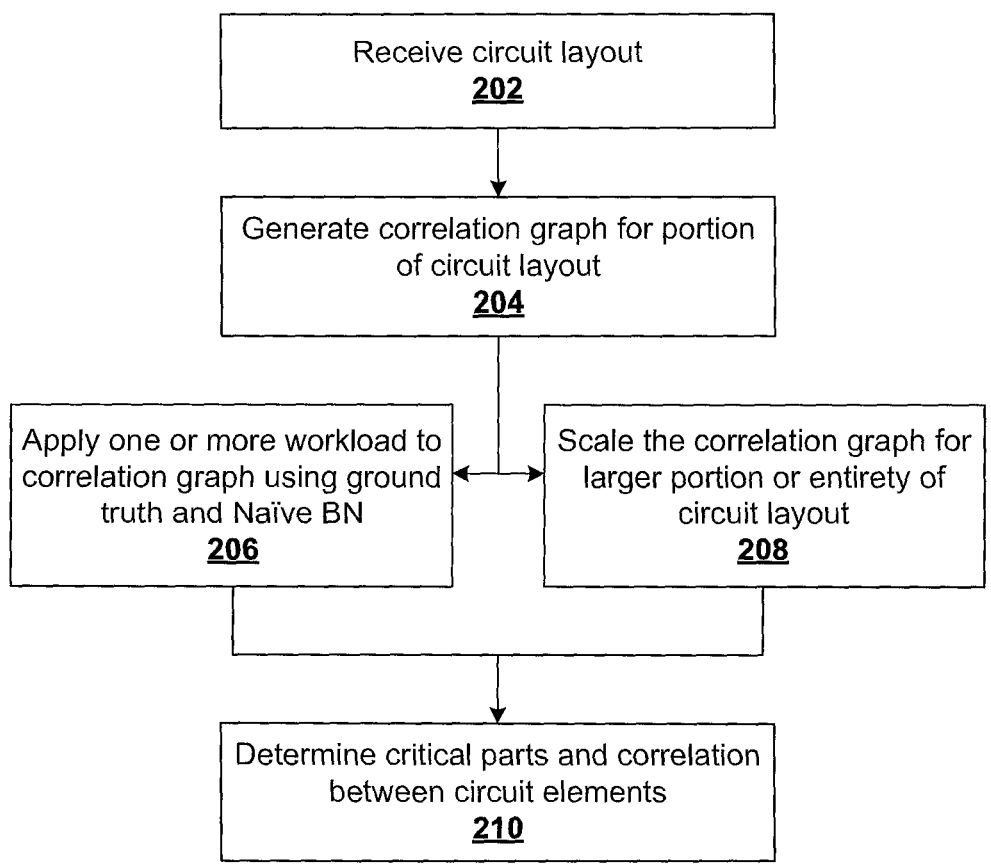
FIG. 2 is a flowchart depicting operational steps of graph analysis program, according to an exemplary embodiment.

FIG. 2 is a flowchart depicting operational steps of graph analysis program 104 for generating a scaled correlation graph of a circuit layout, according to an embodiment of the present invention. More specifically, the operational steps performed by circuit module 106, correlation module 107, and scaling module 108.

Graph analysis program 104 receives a circuit layout or a portion of a circuit layout via circuit module 106 (Step 202). Graph analysis program 104 generates a correlation graph for the received circuit layout or the received circuit portion via correlation module 107 (Step 204). Graph analysis program 104 applies one or more workloads to the correlation graph using centrality, ground truth, and Naïve BN (Step 106) to identify critical parts and component correlation. Graph analysis program 104 scales the correlation graph to cover a larger portion or the entirety of the circuit layout (Step 208) to identify critical parts and component correlation across the entire circuit layout. It should be noted, graph analysis program 104 can scale the correlation graph either before or after the one or more workloads are applied to the correlation graph and before or after the critical parts and component correlations are determined. Graph analysis program 104 determines critical parts and component correlations (Step 210) and may present the correlation graph on GUI 109.

Figure 3:
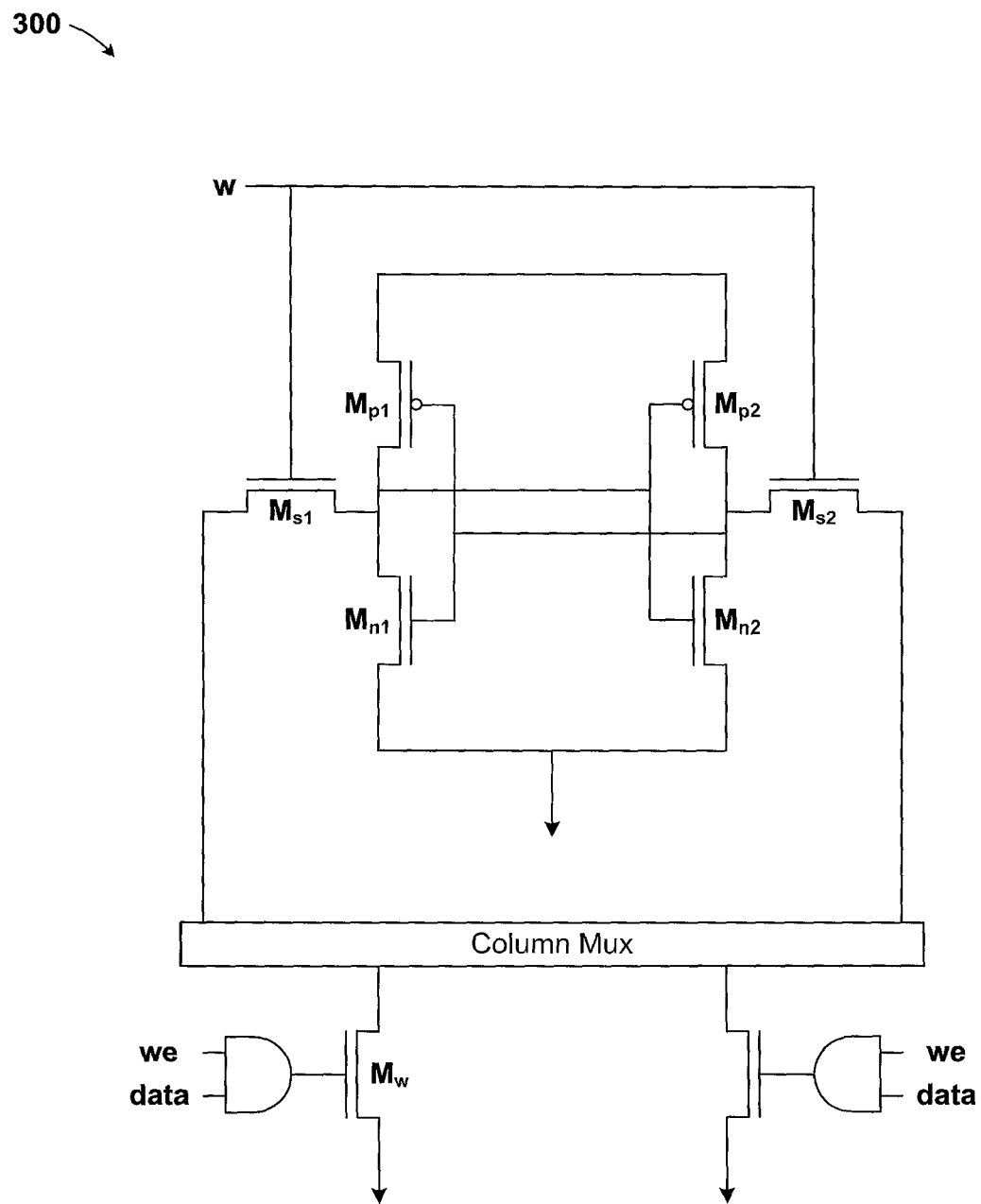
FIG. 3 is a circuit layout portion of a larger circuit layout, according to an exemplary embodiment.

FIG. 3 is a first circuit layout portion 300 of a larger circuit layout or the entire circuit layout, where the first circuit layout portion 300 has a plurality of components and connecting wires, according to an embodiment of the present invention. The components may include $M_{p1}$, $M_{p2}$, $M_{s1}$, $M_{s2}$, $M_{n1}$, and $M_{n2}$ which may be, for example, transistors. Circuit layout portion 300 may be received by circuit module 106 (FIG. 1).

Figure 4:
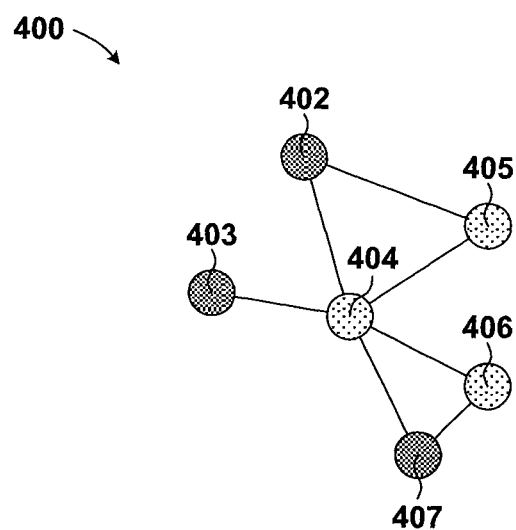
FIG. 4 is a first correlation graph illustrating a correlation between graph nodes and edges, according to an exemplary embodiment.

FIG. 4 is a first correlation graph 400 of the first circuit layout portion 300 represented as nodes and edges, according to an embodiment of the present invention. Circuit components (e.g., $M_{p1}$, $M_{p2}$, $M_{s1}$, $M_{s2}$, $M_{n1}$, and $M_{n2}$) may be represented by nodes 402-407 and connecting wires may be represented as the edges connecting nodes 402-407. One or more workloads may be applied to the circuit and analyzed such that critical parts and component correlations are represented by color or shading of the nodes (e.g., using a CAD program and applying a centrality analysis). For example, a workload to determine betweenness centrality is applied to the first correlation graph 400, rendering a correlation between components 402, 403, and 407 and a correlation between components 404, 405, and 406. In an alternative embodiment, correlations and critical parts may be represented by an output rank (not shown).

Figure 5:
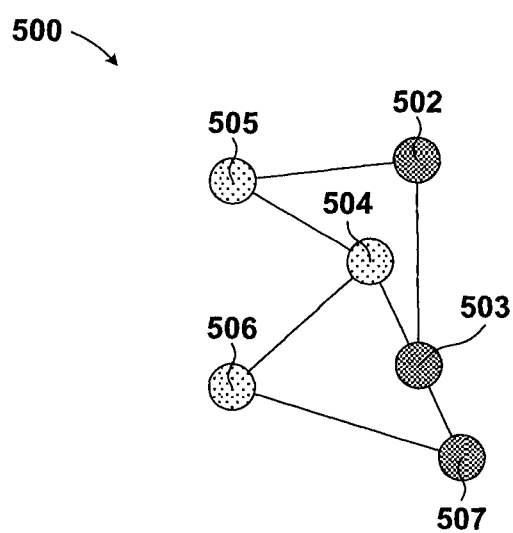
FIG. 5 is a second correlation graph illustrating a correlation between graph nodes and edges, according to an exemplary embodiment.

FIG. 5 is a second correlation graph 500 of a second circuit layout portion of the larger circuit layout or the entire circuit layout having the first circuit layout portion 300. Circuit components and connecting wires of the second circuit layout portion are represented as nodes 502-507 and edges connecting the nodes, respectively. One or more workloads may be applied to the circuit and analyzed such that critical parts and component correlations are represented by color or shading of the nodes (similar to the first correlation graph 400). For example, a workload to determine betweenness centrality is applied to the second correlation graph 500, rendering a correlation between components 502, 503, and 507 and a correlation between components 504, 505, and 506.

Figure 6:
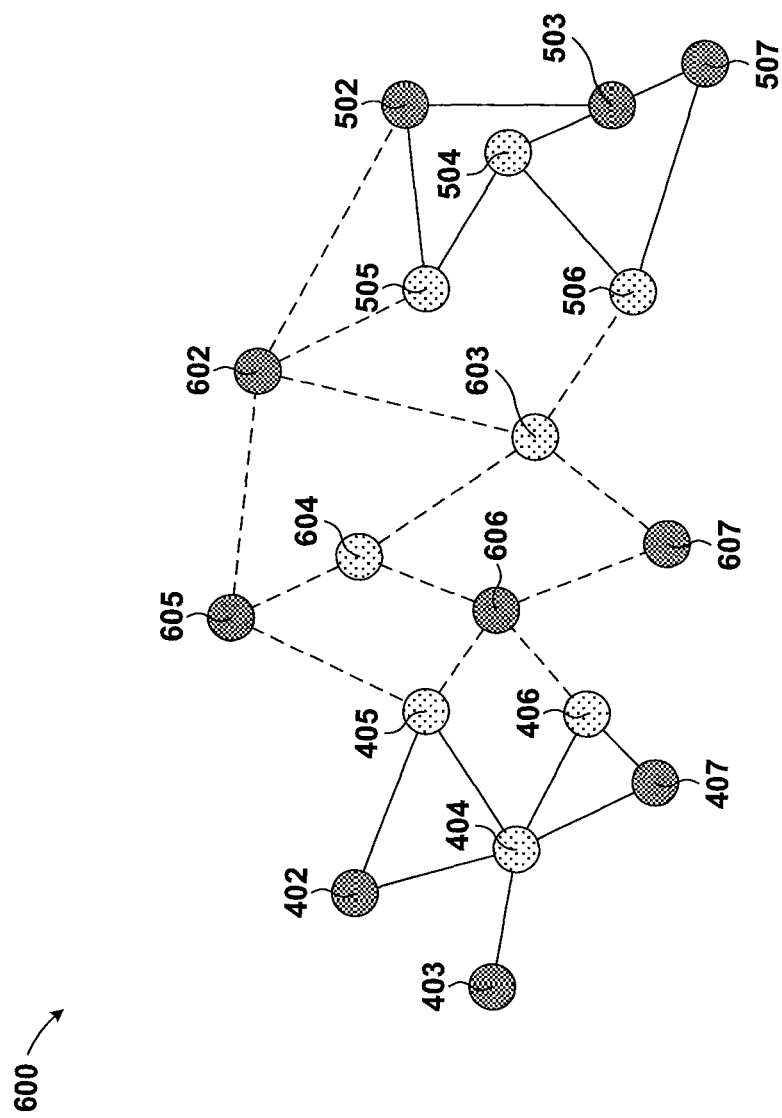
FIG. 6 is a correlation graph of the larger circuit illustrating a correlation between graph nodes and edges, according to an exemplary embodiment.

FIG. 6 is a scaled correlation graph 600 of the first and second correlation graphs 400 and 500, according to an embodiment of the present invention. In the illustrated embodiment, the first correlation graph 400 and the second correlation graph 500 do not have overlapping components, such that scaling module 108 (FIG. 1) will populate the remaining portions of the larger circuit layout between the first and second correlation graphs 400 and 500 (e.g., nodes 602-607 and the connecting edges illustrated as dotted lines). Scaled correlation graph 600 can be presented on GUI 109 to illustrate the determined critical parts and correlating components. In the illustrated embodiment, nodes 402, 403, 407, 602, 605, 606, 607, 502, 503, and 507 have a correlation represented by the dark shading of said correlating component nodes in FIG. 6. It should be noted, FIG. 6 is merely a representation of an entire circuit, however, one skilled in the art will understand that the entire circuit can contain any number of correlation graphs and intervening graph nodes.

Figure 7:
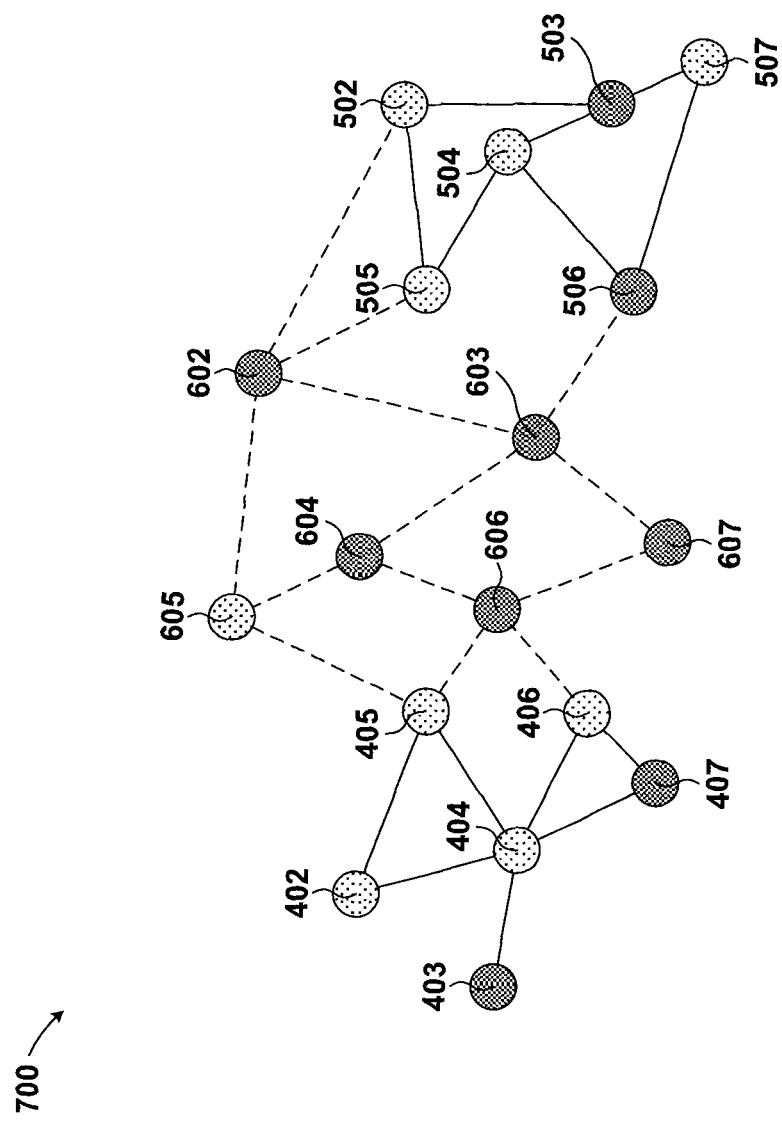
FIG. 7 is another correlation graph of the larger circuit illustrating a correlation between graph nodes and edges, according to an exemplary embodiment.

FIG. 7 is a second scaled correlation graph 700 of the first and second correlation graphs 400 and 500, according to an embodiment of the present invention. In the illustrated embodiment, the first correlation graph 400 and the second correlation graph 500 do not have overlapping components, such that scaling module 108 (FIG. 1) will populate the remaining portions of the larger circuit layout between the first and second correlation graphs 400 and 500 (e.g., nodes 602-607 and the connecting edges illustrated as dotted lines). One or more workloads may be applied to the circuit and analyzed such that critical parts and component correlations are represented by color or shading of the nodes. In this example, a workload to determine closeness centrality is applied (different than scaled correlation graph 600 (betweenness centrality)), which may result in variation in critical parts and component correlation. Graph analysis program 104 can use any analysis method known in the art to aggregate the critical parts and component correlations for different centrality analysis to determine overall critical parts and component correlations across all workloads. Scaled correlation graph 600 can be presented on GUI 109 to illustrate the determined critical parts and correlating components.

Figure 8:
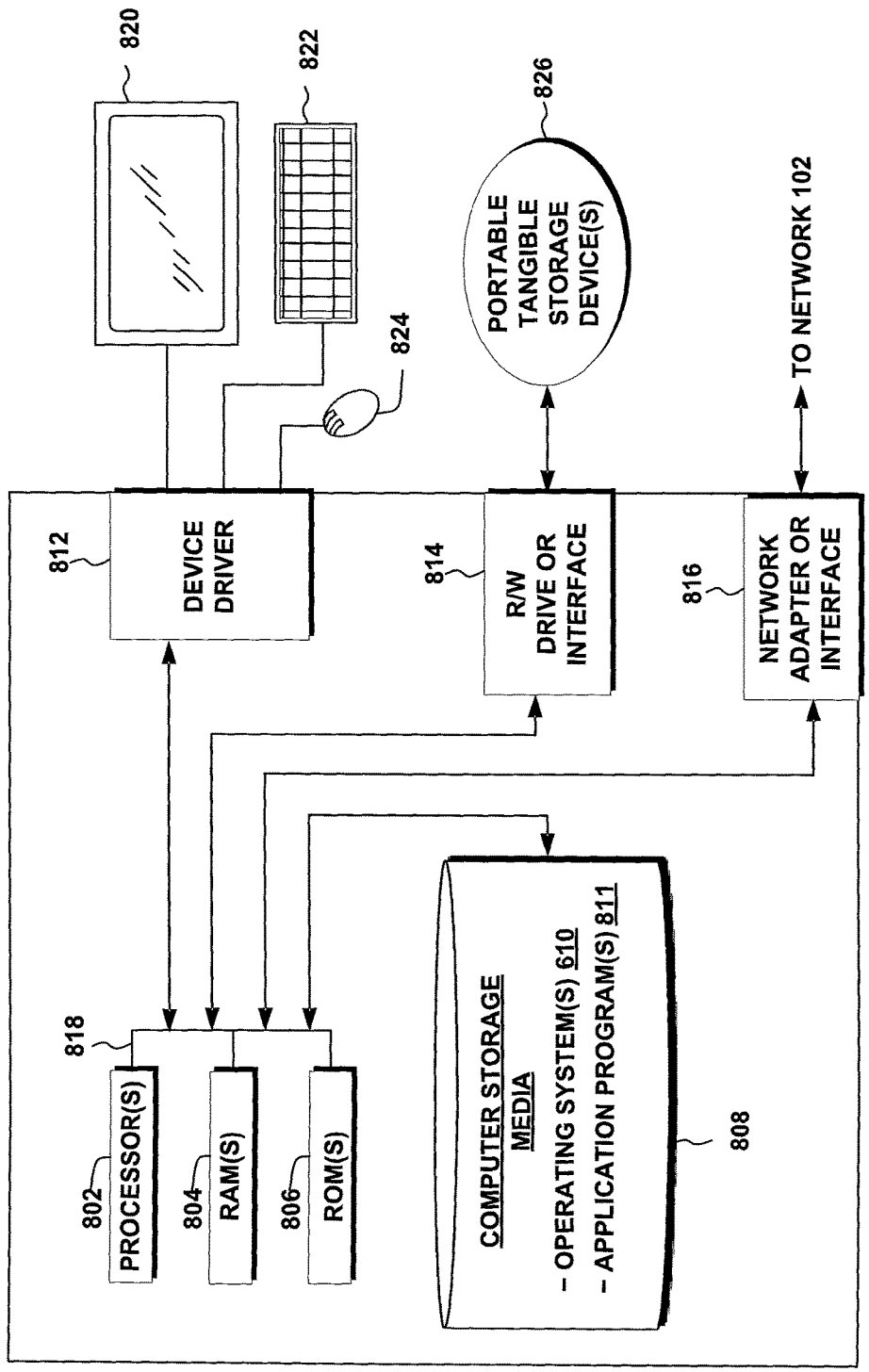
FIG. 8 is a block diagram of components of the a computing device running graph analysis program, according to an exemplary embodiment.

With reference to FIG. 8, a block diagram of components of computing device 102 and/or server 120, in accordance with an illustrative embodiment of the present invention.

Computing device 102 may include one or more processors 802, one or more computer-readable RAMs 804, one or more computer-readable ROMs 806, one or more computer readable storage media 808, device drivers 812, read/write drive or interface 814, network adapter or interface 816, all interconnected over a communications fabric 818. Communications fabric 818 may be implemented with any architecture designed for passing data and/or control information between processors (such as microprocessors, communications and network processors, etc.), system memory, peripheral devices, and any other hardware components within a system.

One or more operating systems 810, and one or more application programs 811, for example, graph analysis program 104, are stored on one or more of the computer readable storage media 808 for execution by one or more of the processors 802 via one or more of the respective RAMs 804 (which typically include cache memory). In the illustrated embodiment, each of the computer readable storage media 808 may be a magnetic disk storage device of an internal hard drive, CD-ROM, DVD, memory stick, magnetic tape, magnetic disk, optical disk, a semiconductor storage device such as RAM, ROM, EPROM, flash memory or any other computer-readable tangible storage device that can store a computer program and digital information.

Computing device 102 may also include a R/W drive or interface 814 to read from and write to one or more portable computer readable storage media 826. Graph analysis program 104 on computing device 102 may be stored on one or more of the portable computer readable storage media 826, read via the respective R/W drive or interface 814 and loaded into the respective computer readable storage media 808.

Computing device 102 may also include a network adapter or interface 816, such as a TCP/IP adapter card or wireless communication adapter (such as a 4G wireless communication adapter using OFDMA technology). Application programs 811 on computing device 102 may be downloaded to the computing device from an external computer or external storage device via a network (for example, the Internet, a local area network or other wide area network or wireless network) and network adapter or interface 816. From the network adapter or interface 816, the programs may be loaded onto computer readable storage media 808. The network may comprise copper wires, optical fibers, wireless transmission, routers, firewalls, switches, gateway computers and/or edge servers.

Computing device 102 may also include a display screen 820, a keyboard or keypad 822, and a computer mouse or touchpad 824. Device drivers 812 interface to display screen 820 for imaging, to keyboard or keypad 822, to computer mouse or touchpad 824, and/or to display screen 820 for pressure sensing of alphanumeric character entry and user selections. The device drivers 812, R/W drive or interface 814 and network adapter or interface 816 may comprise hardware and software (stored on computer readable storage media 808 and/or ROM 806).

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a non-transient computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as Follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as Follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as Follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 9:
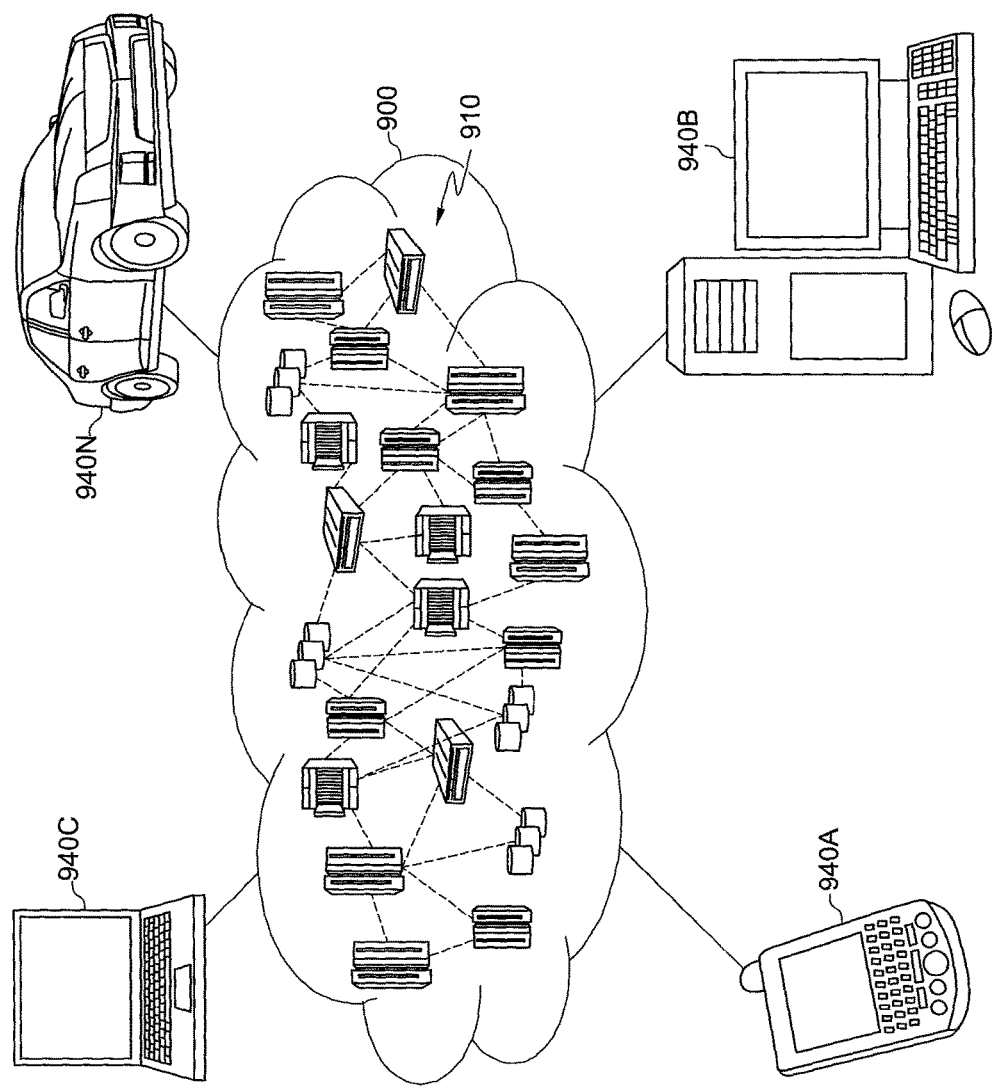
FIG. 9 depicts a cloud computing environment, according to an exemplary embodiment.

Referring now to FIG. 9, an exemplary illustration of a cloud computing environment is depicted, according to an embodiment of the present invention. The cloud computing environment can include one or more cloud computing nodes with which local computing devices used by cloud consumers, such as, for example, personal digital assistant (PDA) or cellular telephone 940A, desktop computer 940B, and/or laptop computer 940C may communicate. The nodes may be grouped (not shown) physically or virtually, in one or more networks, such as Private, Community, Public, or Hybrid clouds as described hereinabove, or a combination thereof. This allows the cloud computing environment to offer infrastructure, platforms and/or software as services for which a cloud consumer does not need to maintain resources on a local computing device. It is understood that the types of computing devices 940A-C are intended to be illustrative only and that computing nodes and the cloud computing environment can communicate with any type of computerized device over any type of network and/or network addressable connection (e.g., using a web browser).

Figure 10:
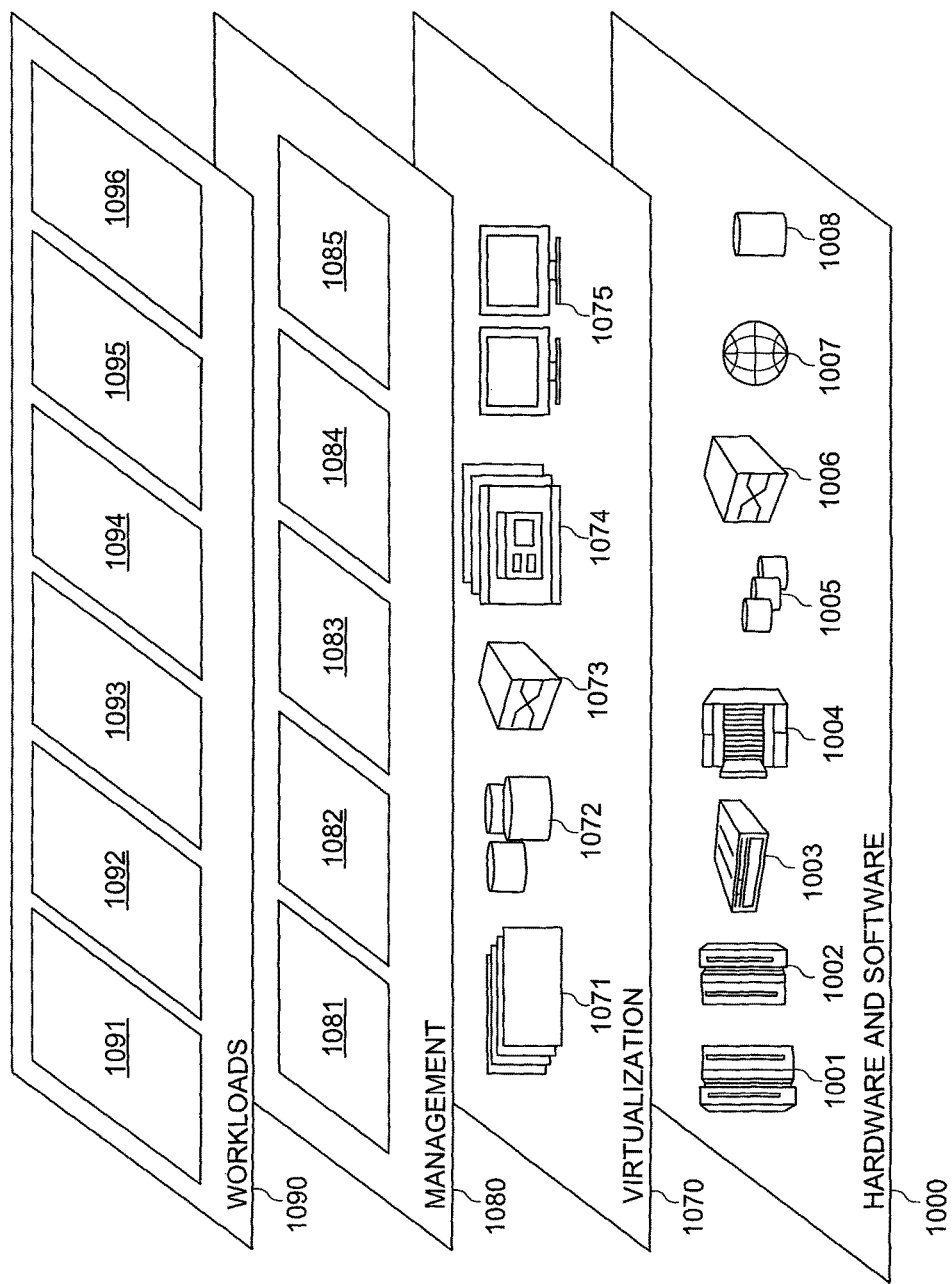
FIG. 10 depicts abstract model layers of a cloud computing environment, according to an exemplary embodiment.

Referring now to FIG. 10, a set of functional abstraction layers 1000 provided by the cloud computing environment illustrated in FIG. 9 is shown. It should be understood in advance that the components, layers, and functions shown in FIG. 10 are intended to be illustrative only and embodiments of the invention are not limited thereto. As depicted, the following layers and corresponding functions are provided:

Hardware and software layer 1000 includes hardware and software components. Examples of hardware components include: mainframes 1001; RISC (Reduced Instruction Set Computer) architecture based servers 1002; servers 1003; blade servers 1004; storage devices 1305; and networks and networking components 1006. In some embodiments, software components include network application server software 1007 and database software 1008.

Virtualization layer 1070 provides an abstraction layer from which the following examples of virtual entities may be provided: virtual servers 1071; virtual storage 1072; virtual networks 1073, including virtual private networks; virtual applications and operating systems 1074; and virtual clients 1075.

In one example, management layer 1080 may provide the functions described below. Resource provisioning 1081 provides dynamic procurement of computing resources and other resources that are utilized to perform tasks within the cloud computing environment. Metering and Pricing 1082 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 1083 provides access to the cloud computing environment for consumers and system administrators. Service level management 1084 provides cloud computing resource allocation and management such that required service levels are met. Service Level Agreement (SLA) planning and fulfillment 1085 provide pre-arrangement for, and procurement of, cloud computing resources for which a future requirement is anticipated in accordance with an SLA.

Workloads layer 1090 provides examples of functionality for which the cloud computing environment may be utilized. Examples of workloads and functions which may be provided from this layer include: mapping and navigation 1091; software development and lifecycle management 1092; virtual classroom education delivery 1393; data analytics processing 1094; transaction processing 1095; and graph analysis program processing 1096.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer-implemented method comprising:
receiving, by one or more computer processors, a portion of an integrated circuit design, wherein the portion of the integrated circuit design comprises integrated circuit components and component connections between the integrated circuit components;
converting, by one or more computer processors, the received portion of the integrated circuit design into a circuit correlation graph, wherein the integrated circuit components are represented as nodes on the circuit correlation graph and the component connections are represented by edges on the circuit correlation graph;
determine, by one or more computer processors, a ground truth for the received integrated circuit design represented by the circuit correlation graph;
applying, by one or more computer processors, one or more workloads to the circuit correlation graph to determine an importance of each node and correlations between the nodes of the circuit correlation graph, wherein correlations between nodes represent correlations between integrated circuit components of the integrated circuit design; and
applying a centrality analysis and using the determined ground truth and Naïve Bayes to determine a weight value to apply to each node of the circuit correlation graph.

2. The computer-implemented method of claim 1, further comprising:
scaling, by one or more computer processors, the portion of the integrated circuit to include remaining portions of the integrated circuit design; and
generating, by one or more computer processors, a scaled circuit correlation graph for the integrated circuit design.

3. The computer-implemented method of claim 1, further comprising:
presenting, by one or more computer processors, the circuit correlation graph including the correlations between nodes of the circuit correlation graph and the weight value to a graphical user interface (GUI).

4. The computer-implemented method of claim 3, wherein the importance of each node and the correlations between nodes are represented on the circuit correlation graph using different shading and different colors, wherein nodes with the same shading or color are highly correlated and nodes with different shading or color have a lower correlation.

5. The computer implemented method of claim 3, wherein the importance of each node and the correlations between nodes are represented by an output rank.

6. The computer-implemented method of claim 1, wherein the components include transistors and the component connections are electrical wires.

7. The computer-implemented method of claim 1, wherein the centrality analysis includes one or more of betweenness centrality, closeness centrality, eigenvector centrality, degree centrality, harmonic centrality, and katz centrality.

8. A computer program product comprising:
one or more computer-readable storage media and program instructions stored on the one or more computer-readable storage media, the program instructions comprising:
program instructions to receive, by one or more computer processors, a portion of an integrated circuit design, wherein the portion of the integrated circuit design comprises integrated circuit components and component connections between the integrated circuit components;
program instructions to convert, by one or more computer processors, the received portion of the integrated circuit design into a circuit correlation graph, wherein the integrated circuit components are represented as nodes and the component connections are represented by edges on the circuit correlation graph;
program instructions to determine, by one or more computer processors, a ground truth for the received integrated circuit design represented by the circuit correlation graph;
program instructions to apply, by one or more computer processors, one or more workloads to the circuit correlation graph to determine an importance of each node and correlations between the nodes of the circuit correlation graph, wherein correlations between nodes represent correlations between integrated circuit components of the integrated circuit design; and
program instructions to apply, by one or more computer processors, a centrality analysis and using the determined ground truth and Naïve Bayes to determine a weight value to apply to each node of the circuit correlation graph.

9. The computer program product of claim 8, further comprising:
program instructions to scale, by one or more computer processors, the portion of the integrated circuit to include remaining portions of the integrated circuit design; and
program instructions to generate, by one or more computer processors, a scaled circuit correlation graph for the integrated circuit design.

10. The computer program product of claim 8, further comprising:
program instructions to present, by one or more computer processors, the circuit correlation graph including the correlations between nodes of the circuit correlation graph and the weight value to a graphical user interface (GUI).

11. The computer program product of claim 10, wherein the importance of each node and the correlations between nodes are represented on the circuit correlation graph using different shading and different colors, wherein nodes with the same shading or color are highly correlated and nodes with different shading or color have a lower correlation.

12. The computer program product of claim 10, wherein the component importance of each node and the correlations between nodes are represented by an output rank.

13. The computer program product of claim 8, wherein the components include transistors and the component connections are electrical wires.

14. The computer program product of claim 8, wherein the centrality analysis includes one or more of betweenness centrality, closeness centrality, eigenvector centrality, degree centrality, harmonic centrality, and katz centrality.

15. A computer system comprising:
one or more computer processors;
one or more computer-readable storage media; and
program instructions stored on the computer-readable storage media for execution by at least one of the one or more computer processors, the program instructions comprising:
  program instructions to receive, by one or more computer processors, a portion of an integrated circuit design, wherein the portion of the integrated circuit design comprises integrated circuit components and component connections between the integrated circuit components;
  program instructions to convert, by one or more computer processors, the received portion of the integrated circuit design into a circuit correlation graph, wherein the integrated circuit components are represented as nodes on the circuit correlation graph and the component connections are represented by edges on the circuit correlation graph;
  program instructions to determine, by one or more computer processors, a ground truth for the received integrated circuit design represented by the circuit correlation graph;
  program instructions to apply, by one or more computer processors, one or more workloads to the circuit correlation graph to determine an importance of each node and correlations between the nodes of the circuit correlation graph, wherein correlations between nodes represent correlations between integrated circuit components of the integrated circuit design; and
  program instructions to apply, by one or more computer processors, a centrality analysis and using the determined ground truth and Naïve Bayes to determine a weight value to apply to each node of the circuit correlation graph.

16. The computer program product of claim 15, further comprising:
  program instructions to scale, by one or more computer processors, the portion of the integrated circuit to include remaining portions of the integrated circuit design; and
  program instructions to generate, by one or more computer processors, a scaled circuit correlation graph for the integrated circuit design.

17. The computer program product of claim 15, further comprising:
  program instructions to present, by one or more computer processors, the circuit correlation graph including the correlations between nodes of the circuit correlation graph and the weight value to a graphical user interface (GUI).

18. The computer program product of claim 17, wherein the importance of each node and the correlations between nodes are represented on the circuit correlation graph using different shading and different colors, wherein nodes with the same shading or color are highly correlated and nodes with different shading or color have a lower correlation.

19. The computer program product of claim 17, wherein the importance of each node and the correlations between nodes are represented by an output rank.

20. The computer program product of claim 15, wherein the components include transistors and the component connections are electrical wires.

* * * * *